C. L. KEYES.
TIRE HOLDER.
APPLICATION FILED JUNE 15, 1915.
1,173,980.
Patented Feb. 29, 1916.
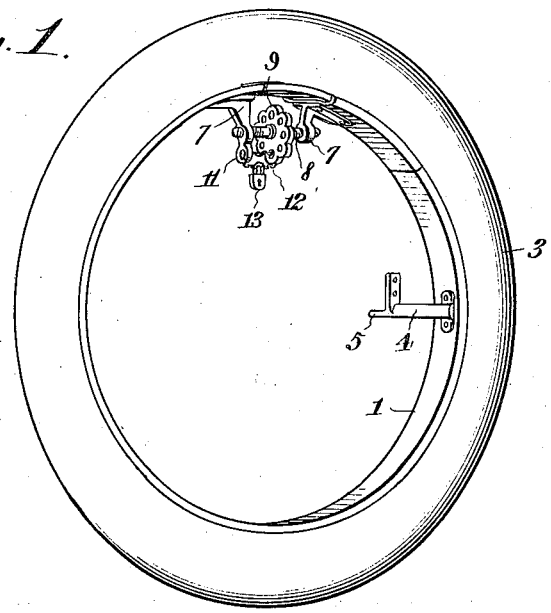
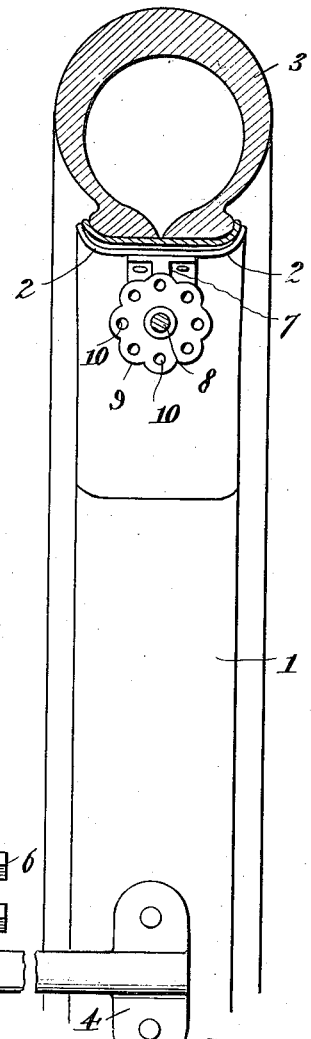
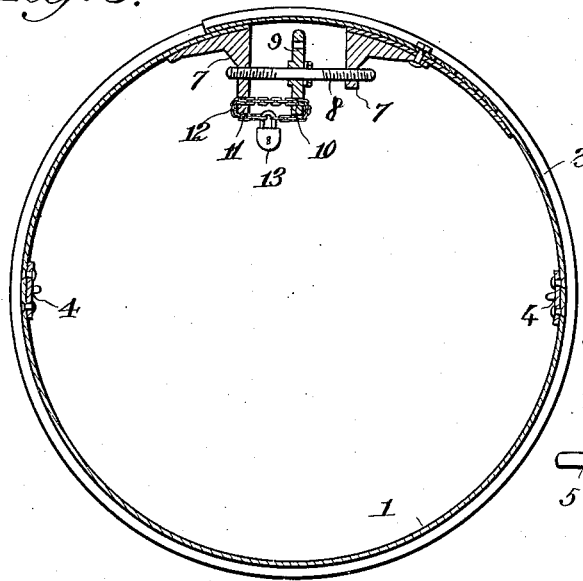
Inventor,
Clarence L. Keyes
By Victor J. Evans,
Attorney.
Witnesses:
C. Heinle, Jr.,
M. L. Taft.

UNITED STATES PATENT OFFICE.

CLARENCE LINDLEY KEYES, OF PERU, INDIANA.

TIRE-HOLDER.

1,173,980.　　Specification of Letters Patent.　　Patented Feb. 29, 1916.

Application filed June 15, 1915. Serial No. 34,218.

*To all whom it may concern:*

Be it known that I, CLARENCE L. KEYES, a citizen of the United States, residing at Peru, in the county of Miami and State of Indiana, have invented new and useful Improvements in Tire-Holders, of which the following is a specification.

This invention relates to a holder adapted to support a tire upon the body of an automobile or similar vehicle and it consists in the novel features hereinafter described and claimed.

An object of the invention is to provide a holder of the character indicated which is of simple and durable structure and which will effectually support the casing of a tire in position upon the body of the vehicle in a manner to prevent the casing from accumulating dust, dirt or other foreign substances and at the same time affording means for holding the casing in a position and manner to be readily removed from the holder when it is desired to use the same.

With the above objects in view the holder comprises a circular strip of metal having overlapping ends with means provided at the edges of the strip for gripping the shoulders of the tire casing. Brackets are attached to the strip and may be connected with the body of the vehicle for limited swinging movement. Lugs are provided upon the strip in the vicinity of the ends thereof and are internally threaded. A right and left hand screw threaded bolt engages the lugs and a knob is mounted upon the bolt whereby the same may be turned. Therefore, when the casing is applied to the strip and the said bolt is turned the strip is expanded whereby the edge portions thereof grip the shoulders of the casing and securely hold the same. One of the said lugs is provided with an extension having an opening and the knob is provided with a series of openings and a chain or other flexible member may be passed through the opening of the extension and one of the openings of the knob and the end portions of the said chain may be secured by lock or other suitable means, whereby it is practically impossible for an unauthorized person to remove the casing from the holder.

In the accompanying drawing: Figure 1 is a perspective view of the holder with a tire casing applied. Fig. 2 is a transverse sectional view of part of the holder with the tire casing applied. Fig. 3 is a vertical sectional view of the holder.

The holder comprises a metallic strip 1 preferably of sheet material, and which is substantially circular in edge elevation. The said strip 1 is provided at its edges with longitudinally disposed recesses 2 adapted to receive the shoulders of a tire casing indicated at 3. The ends of the strip 1 overlap each other and the end portions of the said strip may be moved with relation to each other whereby the diameter of the strip may be increased or diminished.

Brackets 4 are attached to the strip 1 at points approximately at diametrically opposite sides of the strip and the said brackets are provided with upstanding lugs or shoulders 5. Bolts 6 pass through the brackets 4 and serve as means for connecting the brackets to the body of the vehicle. When the brackets 4 are in position upon the body of the vehicle shoulders 5 are inserted in openings provided in the body. Lugs 7 are mounted at the inner side of the strip 1 in the vicinity of the ends thereof and a right and left hand screw bolt 8 has threaded engagement with the lugs 7 and is turnably mounted with relation to the same. A knob 9 is fixed to the intermediate portion of the bolt 8 and is provided with a series of openings 10. One of the lugs 7 is provided with an extension 11 having an opening which is approximately opposite one of the openings 10 in the knob 9. A chain 12, or other flexible element, may be passed through the opening in the extension 11 and one of the openings 10 in the knob 9 and the ends of the said chain or flexible element may be connected together by means of a padlock 13.

Assuming that it is the desire to secure a tire casing 3 in position upon the strip 1, the bolt 8 is turned whereby the end portions of the strip 1 are caused to overlap each other to a degree which reduces the diameter of the strip sufficiently to permit the casing 3 to be passed over the same. The bolt 8 is then turned in an opposite direction whereby the strip 1 is expanded or its diameter is increased and thus the shoulders of the casing 3 are secured in the recesses 2 and the said casing is firmly mounted upon the strip 1. During the expansion and contracting of the strip 1 the brackets 4 may swing sufficiently upon the pivot bolts 6 to permit of the movements indicated. When the tire is in position upon the strip 1 the chain 12 and pad-lock 13 are applied as hereinbefore described and thus means is provided for locking the tire casing 3 in position upon the strip 1. To remove the said casing from the said strip the operation just described is reversed.

From the above description taken in conjunction with the accompanying drawing it will be seen that a tire holder of simple and durable structure is provided and that the parts thereof may be easily and quickly manipulated to permit the positioning thereon of the tire and securing of the same and also the parts may be as conveniently manipulated to permit the removal of the tire and the casing from the holder.

Having described the invention what is claimed is:—

A tire holder comprising a strip substantially circular in edge elevation and having overlapping ends, means for supporting the strip, said strip being provided with means for engaging the shoulders of a tire, lugs mounted upon the strip, a screw bolt turnably mounted in the lugs for expanding and contracting the strip, a knob mounted upon the bolt and having openings, one of the lugs having an extension provided with an opening and a securing device adapted to be passed through said extension opening and one of the openings in the knob.

In testimony whereof I affix my signature in presence of two witnesses.

CLARENCE LINDLEY KEYES.

Witnesses:
  WM. B. McCLINTIC,
  J. J. KEYES.